Nov. 23, 1954
J. T. BECK
2,695,351
ELECTRIC CIRCUIT COMPONENTS AND METHODS OF PREPARING THE SAME
Filed Jan. 12, 1950
3 Sheets-Sheet 2
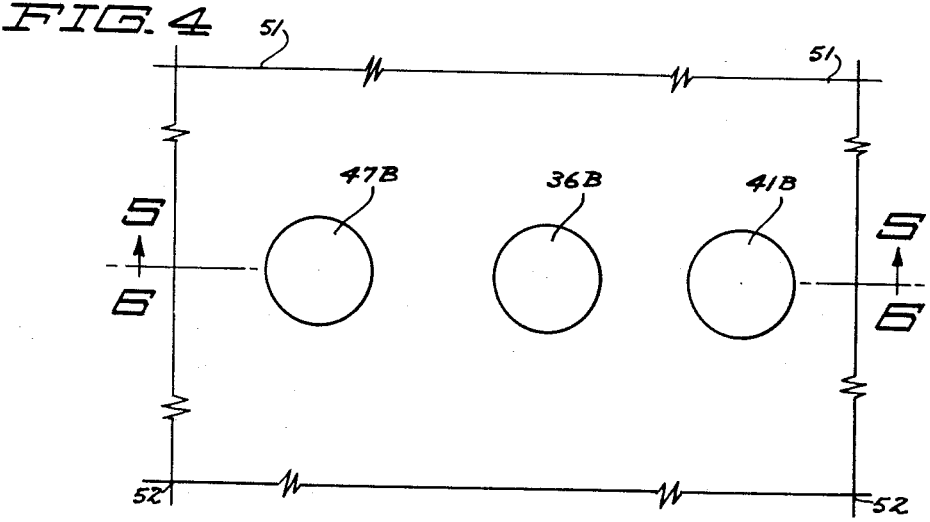
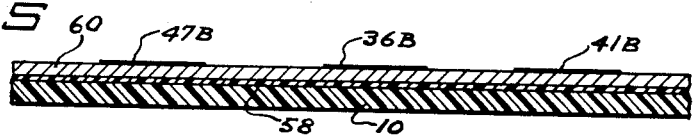
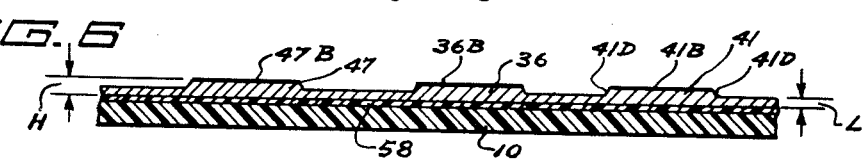
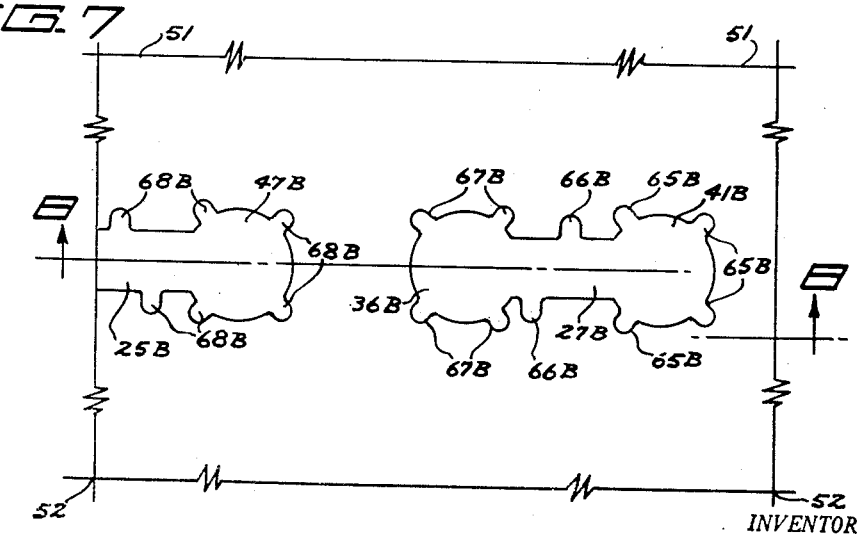
INVENTOR.
JOHN T. BECK
BY
*Paul, Paul & Moore*
ATTORNEYS

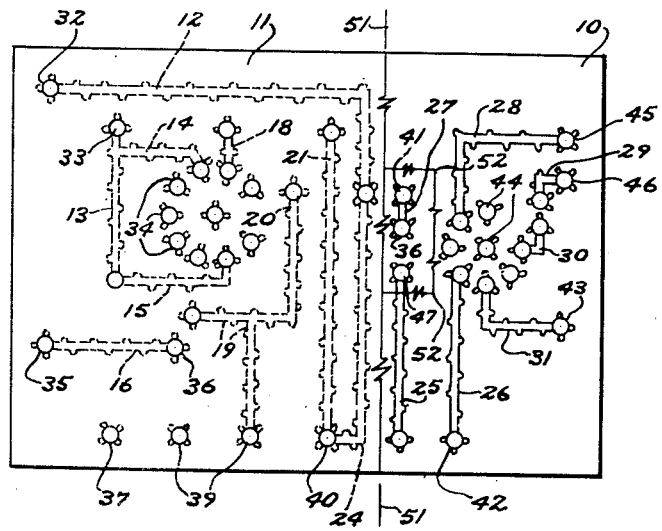

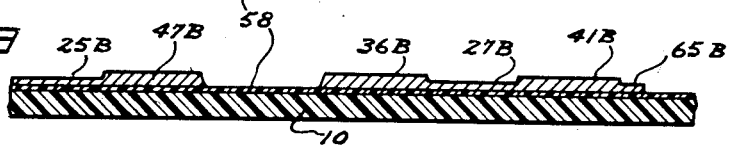
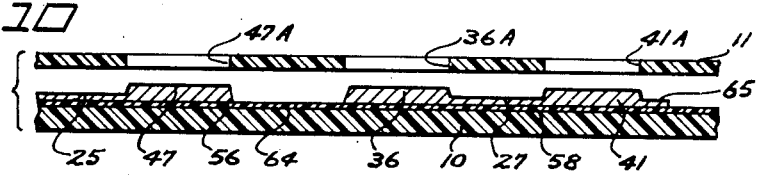
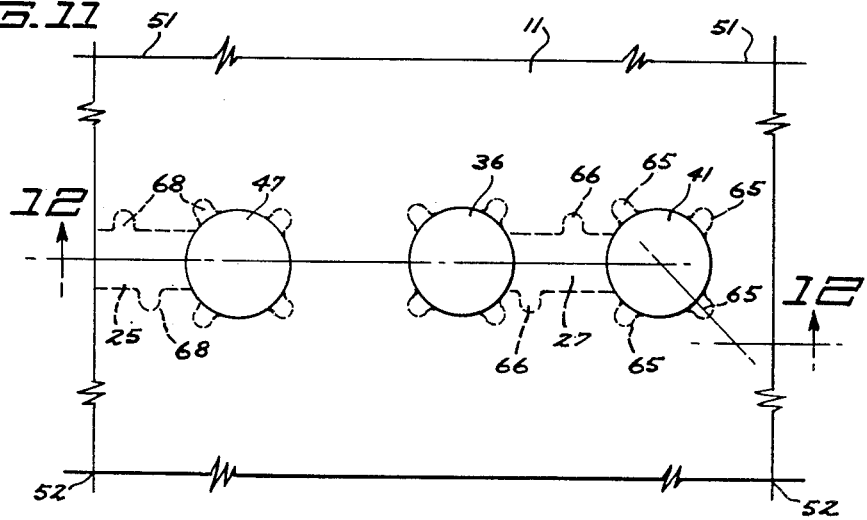
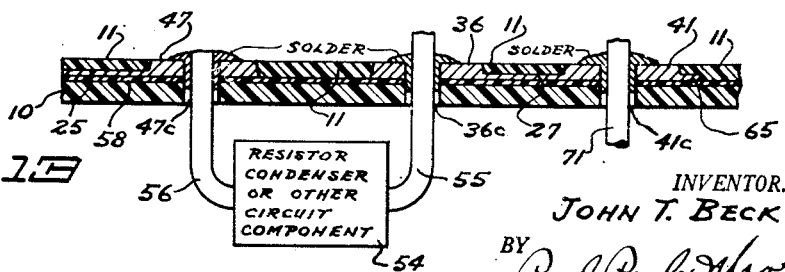
INVENTOR.
JOHN T. BECK United States Patent Office 2,695,351
Patented Nov. 23, 1954

2,695,351

ELECTRIC CIRCUIT COMPONENTS AND METHODS OF PREPARING THE SAME

John T. Beck, White Bear Lake, Minn., assignor to Beck's Inc., St. Paul, Minn., a corporation of Minnesota Application January 12, 1950, Serial No. 138,247

9 Claims. (Cl. 201—64)

This invention relates to electric circuit components and methods of preparing same. In conventional electric circuits, the circuit is constructed by utilizing a frame or panel which may be of diverse materials, to which there are customarily attached metallic elements which constitute portions of the circuit being constructed. These metallic elements, which may be resistors, condensers, impedances, switches, binding posts and other elements vary in form and may include vacuum tubes and the like. The circuit elements are usually mounted upon the chassis, panel board or base and are then connected together by means of electrical conductors, usually of round section and properly insulated, these electrical conductors being suitably supported by mechanically attaching them on the structure of the chassis, panel board or base on which the circuit is constructed, and electrically connecting them by solder, screws or bolts to the circuit elements. Circuits of this type have the advantage that the circuit elements, such as resistors, condensers, impedances, etc. are individual accessible elements which can be replaced or repaired and have the further advantage that the circuit connections can be made of high conductivity material. The individual electrical connections in circuits of this prior art type are placed one by one, and the connections made by individually soldering, screwing or bolting the leads in place. This is a disadvantage. Another disadvantage is the weight and bulk of the circuits. However, until very recently this method has been utilized in building most electric circuits.

More recently there have been developed circuits in which some or all of the components are composed of members that are "printed" on an insulating background, usually of ceramic material. While circuits of the printed type do offer advantages of light weight and easy duplication, once manufacturing facilities for their production have been provided, the circuit elements are comparatively fragile and are not of high conductivity, as compared with electrical copper, and the circuits do not readily adapt themselves to the attachment thereto of external leads by soldering or otherwise. For example, a circuit which is printed on is thin and tends to "lift" when soldered. Hence, some of the frequent tests utilized in estimating the serviceability of a printed circuit is to immerse the insulating element, with the printed circuit thereon, in a bath of molten solder and then observe the results. Not infrequently the printed-on circuit components will peel and dislodge from the underlying insulating material upon which they have been printed. This causes destruction of the circuits as will be readily appreciated. Such a test, incidentally, is a very practical one for it is desirable for mass production to be able first to assemble the circuit component and the individual circuit elements and then "dip" the unit for soldering in one operation, all of the connections involved. If this cannot be done the circuit component is impractical.

Likewise, the effect of humidity and weathering on the ordinary printed circuit components is most pronounced, and printed circuits heretofore constructed have not been able to withstand such weathering, particularly in extremely moist or humid climates. In addition, the printed-on circuit components are necessarily very thin and relatively non-conductive as compared with usual copper conductors and are not satisfactory for switch or commutator contacts, where a wiping action is encountered. A further disadvantage of printed circuits heretofore provided is that the circuits are exposed on one side of the ceramic or other insulating base, upon which the circuits are printed, and are not locked into the base material.

It is an object of the present invention to provide improved circuits of very minute or larger size and capable of being easily manufactured in mass production and at low cost and capable of being used for production of dip-soldered connections with circuit elements.

It is a further object of the invention to provide an improved electric circuit of the aforesaid character which is completely sealed from the weather and other deteriorating effects, except at a minimum of exposed terminal points to which soldered or other mechanical connections may be made, and to provide such circuit components for switches and the like.

It is a further object of the invention to provide improved circuit components and methods of producing the same wherein the circuit components are capable of being produced in all sizes from large to the very smallest, and yet so constructed as to resist the adverse effect of weathering, moisture and deterioration due to the elements, capable of being dipped in solder for making connections and capable of being used for wiping or other mechanical contacts.

It is a further object of the invention to provide circuit components and processes of preparing the same which may be duplicated easily in mass production and at low cost without sacrificing the high conductivity of copper and without sacrificing the advantages inherent in metallic conductors of chosen thickness, resistivity and kind, which may be varied in accordance with the circuit design being constructed.

It is a further object of the invention to provide an improved circuit component and method of preparing the same wherein the circuit elements are completely embedded between lamina of hardened plastic, except for such terminal points for purposes of connection or contact, as may be desired to be provided.

It is another object of the invention to provide improved circuit components and methods of preparing the same wherein the circuit elements, terminal points, and other portions of the circuit are completely embedded in plastic insulating material and are anchored thereto.

Other and further objects of the invention are those inherent in the apparatus herein illustrated, described and claimed.

The invention is illustrated with reference to the drawings in which corresponding numerals refer to the same parts and in which Figure 1 is a plan view of an illustrative circuit component made in accordance with the present invention showing certain of the circuit elements partly broken away;

Figure 2 is an enlarged fragmentary plan view partly broken away showing the materials used and showing the first step in making the illustrative circuit element shown in Figure 1;

Figure 3 is a sectional view taken along the line and in the direction of arrows 3—3 of Figure 2;

Figure 4 is an enlarged fragmentary plan view corresponding to the area shown in Figure 2 illustrating a second step in the method of preparing circuit components in accordance with the present invention, namely, application of a protective coating outlining to the circuit elements desired to be produced;

Figures 5 and 6 are sectional views taken along the line and in the direction of arrows 5—6 of Figure 4, Figure 5 illustrating the circuit components of Figure 4 after the initial protective coating has been applied to selected areas thereof but before etching, whereas Figure 6 illustrates the same but after etching;

Figure 7 is an enlarged fragmentary plan view corresponding to that shown in Figure 4 showing additional protective coating material applied to additional areas of the metal of the circuit component being constructed;

Figures 8 and 9 are sectional views taken along the line and in the direction of arrows 8—9 of Figure 7, Figure 8 illustrating the component prior to the second etching, and Figure 9 after the second etching has been completed;

Figure 10 is a composite sectional view corresponding to that shown in Figure 9 but illustrating a further step of the process, it being noted that Figure 10 is an exploded composite view showing an additional element which is to be superimposed upon the metallic circuit elements remaining on the underlying plastic sheet;

Figure 11 is an enlarged fragmentary plan view corresponding to that shown in Figure 7, except that it illustrates the completed circuit element;

Figure 12 is a sectional view taken along the lines and in the direction of arrows 12—12 of Figure 11;

Figure 13 is a fragmentary sectional view corresponding to Figure 12 showing how a circuit element is mechanically supported and electrically connected to the circuit component.

For the purpose of explanation of the invention there is shown an illustrative circuit of Figure 1, it being understood at the outset that the particular circuit being formed is of no importance other than that it is the basis for explaining the method and the resultant circuit component that is formed. The illustrated circuit of Figure 1, while pertaining to electronic circuits, should be understood as merely illustrative of any of a large number of circuits of either large or small size, simple or complex, which may be produced in accordance with the present invention and that the instant invention is by no means limited to the production of circuits for electronic devices but may be widely used for the production of other circuits as well and for the production of switch components, resistors and heating elements, and the like.

In Figure 1 there is a circuit component including a base generally designated 10 of insulating material which can be either a hard or soft insulating substance, such as fiber, synthetic resin or plastic suitable for laminating with additional material of the same or different character. Plastic or resinous sheets either with or without fillers, such as fabric, mica, woven glass cloth, etc. may be used. Either cold setting or heat setting resins may be used. Exemplary resins suitable for such purposes include the phenol-formaldehyde, phenol-furfurol, furan, urea-formaldehyde, melamine, vinyl, polystyrene, polyethylene, methyl methacrylite and nylon resins. Suitable fillers, such as glass fiber, mica, earths, wood flour and the like may be used.

Upon the base sheet 10 there is ultimately laminated or formed thereon another superimposed insulating resinous sheet 11 and between the two resinous or plastic insulating sheets 10 and 11, which are bonded together, there are formed the conductive elements, of which many are shown in Figure 1. Thus, the conductive elements of the circuit shown in Figure 1 include the conductors 12—16, 18—21, 24—31, which are exemplary, some of which terminate in connection points which are illustrated by the round terminal areas 32—47. All of the terminals are not specifically designated in Figure 1 since they are merely illustrative. It will be understood that the part of Figure 1 to the left of the line 51—51 illustrates the upper surface of sheet 1 through which the round terminal appears in solid lines, whereas the conduction strips forming circuit connections in the circuit component are beneath sheet 11 (i. e. between sheets 10 and 11) and are shown in dotted lines. To the right of line 51—51 the various circuit connection strips and round terminals are shown exposed since in Figure 1 in this part the sheet 11 has been shown as broken away. It will be understood that the terminals and conduction strips may be any shape desired and may constitute terminals or contacts as switch contacts. To the terminals, or certain of them, there may ultimately be connected external resistors, capacitors, switch blades, vacuum tube leads, etc., as required by the circuit being made.

Within the area bounded by the lines 51—51 and 52—52 are illustrated terminals 41, 36 and 47, line 27 and a portion of line 25, and it is this specific area which is shown on much enlarged scale in the remaining figures of the drawings, to which reference is now made.

Referring to Figure 2 there is illustrated in greatly enlarged scale the area between lines 51—51 and 52—52. In Figure 2 there is shown the base sheet 10 of hardenable resinous (plastic) insulating material such as those aforementioned. Upon sheet 10 there is another layer 58 of adhesive, preferably also a resinous adhesive, capable of being cured either with or without heat and pressure into a solid insulating mass. The adhesive 58 should be capable of being partially cured and of being maintained in the partially cured condition during processing, so that it can be later fully cured to maximum strength. Suitable adhesive resinous materials of this character include the vinyl, phenolic, resorcinal, furan, urea, melamine, polystyrene, silicone, and polyacrylic ester resins. Upon the adhesive layer 58 there is superimposed a sheet 60 of conductive metal which can be of any type and can be varied widely in thickness depending upon the size of the conductors desired to be embedded between the plastic sheets. For most purposes electrolytic copper sheet is preferred due to its excellent conductivity. Sheets of metal varying from a fraction of a thousandth of an inch in thickness up to 250 thousandths of an inch in thickness, or even more, may be used, depending upon the loads carried. The metal which may be used for sheet 60 can likewise be widely varied, but it is usually desirable to utilize conductive copper, aluminum, alloys, and in some instances where thin sheets are used, the precious or semi-precious metals may be utilzed wthout undue cost because of their desirable resistance to corrosion and good electrical conductivity. The sheet of metal 60 is attached to the underlying layer of plastic 10 by means of the adhesive resin layer 58, the two sheets 60 and 10 being pressed together under light pressure and moderately heated until the plastic 58 is only partially cured. In this way the sheet 60 can be firmly attached to the underlying sheet 10 of insulating plastic for further handling during the process. Where holes are ultimately desired through the connection points such as at 41B, 36B and 47B in the connection points 41, 36 and 47, respectively, Figure 13, these can be punched or drilled through the metal sheet 60 and sheet 10 at this time, although they can also be formed later.

The next step in the process involves the marking of the upper surface of sheet 60 throughout certain selected areas thereof which ultimately form connection points or other areas that are to be exposed through the upper insulating sheet 11 of the composite unit. The areas which are exposed are most frequently terminals to which connections are made by soldering or made by means of rivets, grommets or the like. Thus, in the illustrated form of circuit shown in Figure 1, it will be assumed that it is desired to expose through the upper sheet 11 of insulating plastic those circular areas forming connection posts, such as 32—47, and therefore on the upper face of the metallic sheet 60 there are placed circular areas of a stop-off material, such as a stop-off lacquer or paint such as is used in etching procedures, as the stop-off lacquer (used for the exemplary parts 41B, 36B and 47B) can be the same adhesive type resinous composition as indicated at 58.

The stop-off lacquer or paint can be applied to the metal sheet 60 through a silk screen, stencil, or printed onto the surface of the metal. If desired, light sensitive enamels may be coated on plate 60 and the plate then exposed in those areas desired to be protected. In the exposed areas the stop-off enamel is insolubilized, and the remainder of the (unexposed) enamel can then be removed by washing and developing, as is common in the photolithographic arts.

In Figure 4 there are three such areas, viz. the circular spots 41B, 36B and 47B (which ultimately form contacts 41, 36 and 47, respectively) which are thus covered by a stop-off lacquer or paint capable of resisting the etching bath or etching process by which the metal of sheet 60 is subsequently eroded away, as will be described. The type of materials used for applying the spots 41B, 36B and 47B over the areas ultimately desired to be formed as terminals etc. and exposed through the plastic sheet 11 is selected as suitable for the particular etching process that is used in the next step of the process for eroding away the metal of sheet 60. Many commercial stop-off lacquers and paints are available and hence need not be further specified. Figure 5 shows, in section, the spots 41B, 36B and 47B of stop-off lacquer or paint which is applied to the upper surface of the metal 60 that is held by the adhesive layer 58 upon the underlying plastic sheet 10. The stop-off lacquer or paint is then dried and, if desired, baked.

The composite, as illustrated in Figures 4 and 5, is then subjected to a first etching treatment for the metal 60 of the composite. Any desired etching bath may be used, or electrolytic etching procedure may be utilized for eroding away those exposed portions of the surface of the sheet 60 that are not covered by stop-off lacquer, exemplified in Figures 4 and 5 by the circular areas 41B, 36B and 47B. Thus, where the sheet 60 is composed of copper, the etching bath may consist of iron chloride and copper sulfate solutions or acids, chlorides, or the like suitable for removing copper. Likewise, electrolytic etching baths for copper and the like may be used. Since etching is widely used in the photolithographic art, it is not further specified herein, it being understood that the etching procedure which is utilized is appropriate to the particular metal undergoing treatment and is not deleterious to the underlying plastic layers 10 and 58.

The first etching step is allowed to continue until a substantial proportion of the thickness of the metal 60 is eroded away, to a depth such as that illustrated in the sectional view, Figure 6, wherein the surface of the metal 60, which originally was of thickness H, has been eroded or etched down to the thickness L. It may be noted that around the marginal edges of the stop-off material 61 the metal is not etched vertically but is etched along a somewhat curved or outwardly slanted line as at 41D of area 41. The slant of this line or margin can be varied by adjusting the etching speed as is well known in the art of etching used in preparing photolithographic plates. This may be accomplished, for example, by adjusting the speed of the iron chloride bath, or in electrical etching by adjusting the voltage and the air agitation. The etching is continued until the metal 60 is about 50% to 90%, preferably about 85%, of its original thickness.

The composite is then removed from the etching bath and is washed and dried thoroughly, and to the upper eroded surface of the metal there is then applied additional stop-off material throughout areas where conductive circuits (which are ultimately between sheets 10 and 11) are desired to be formed. Such additional stop-off material may be applied, as previously described, through a silk screen or sprayed through a stencil, or may be applied by the use of light sensitive enamels as described. Where stencils are used they can desirably be formed photolithographically by etching away a ferrous or non-ferrous metal plate so as to form openings throughout the particular areas where the stop-off material is desired to be sprayed on. Thus, for applying the stop-off material not only for placing the original spots as at 61 in Figure 4, but also throughout the larger areas representing the conductive circuits, in Figure 7, the stop-off material can very desirably be applied by spraying through a thin metal stencil of ferrous material which is held flat against the upper surface of the metal sheet 60 by means of underlying magnets.

In Figure 7 the original areas of the spots of stop-off lacquer or paint 41B and 36B have been connected together by the strip 27B which is ultimately to form connection 27 and, in addition, around the periphery of the combined spot 41B—27B—36B there are tabs extended as at 65B around the periphery of the original area 41B and at 66B along opposite margins of the conductor area 27B and at 67B around the periphery of area 36B. These projections of stop-off enamel or paint form anchor tabs around the terminal areas 41, 27 and 36 and are preferably at least two in number for each terminal. They need not be regularly spaced but can be so if desired. Likewise, the tabs 66B along opposite sides of the conductor areas 27B can be opposite each other but are preferably arranged in staggered relation as is illustrated in Figures 1 and 7. Similarly spot 47B is enlarged by the extending conductor strip area 25B and by the addition of tab areas 68B. The combined area 41B, 27B, 36B, 65B, 66B, and 67B, and the combined area 25B, 47B and 68B, thus formed of lacquer or paint is then thoroughly dried, and the composite, which is illustrated in the sectional view, Figure 8, is then etched a second time by an etching procedure suitable for the metal 60 that is being etched away. Thus the entire composite may be suspended in the bath and the etching procedure is permitted to continue until the remaining exposed portions of metal 60, such as at 57 and 59 of Figure 8, are completely removed, thus leaving only those metals which were originally protected by the spots 41B, 36B and 47B and in addition at lower levels, those portions of the metal which are protected by the second coat of stop-off lacquer or paint that was applied, such as under the areas 25B, 27B, 65B, 66B, 67B and 68B of Figure 7. The etching away of the remaining exposed portions of metal 60 thus exposes the partially curved adhesive resin 58 in all of those areas not covered by the stop-off lacquer or paint protected metal.

The composite, as shown in Figure 9, is then removed from the etching bath and the stop-off material which has been applied is removed by suitable solvent therefor, thus leaving the exposed underlying metal at 25, 27, 36, 41, 47, 65, 66, 67 and 68, Figures 10 and 11.

Referring to Figure 10, the lower part thereof shows the base 10 to which there is adhesively attached by layer 58 the metal portions just referred to which remain after the two-stage etching procedure. Thus, in the area 41, for example, the metal is of maximum thickness equal to the original thickness of the metal sheet 60 which was used, and from the area 41 there are projections outwardly therefrom, as at 65, which serve in the finished device as anchorages between the plastic sheets 10 and 11 which are bonded together. Also connecting from the areas 41 and 36 is the conductor portion 27 and in line therewith, but separated therefrom by the space 64, is the terminal 47 from which extends conductor 25. It will be noted that conductors 25 and 27 and also tabs 65, 66, 67 and 68 (of which 65 appears in Figure 10) are all of thinner section than the original metal sheet. All of the conductors, tabs, etc. of the circuit being formed are made in the final etching operation.

Upon the composite so constructed there is then applied a layer 11 of hardenable plastic sheeting, preferably a thermoplastic heat setting resin sheet of the same or different type plastic as layer 10. The sheet 11 is also die cut so as to have apertures therethrough corresponding to the portions 41, 36 and 47 of maximum elevation (thickness) of metal, which is remaining attached to the underlying sheet 10, as in Figure 10. Thus, in the sheet 11, as shown in Figure 10, there is provided an aperture at 41A, 36A and 47A which fits the circular raised portion at 41, 36 and 47, respectively. No recesses need be made for receiving into the under surface of sheet 11 those conductor, anchorage, or the like portions of raised metallic area of thinner section, as at 25, 27, 65, 66, 67 and 68, since the sheet 11 is formed and punched in uncured state and is consequently able to flow and conform itself during the final heat and pressure molding operation. The lamina 11 is thus applied to the structure shown in the lower part of Figure 10 composed of sheet 11 which, it will be remembered, has exposed partially cured adhesive plastic in the areas between the metal lands thereon, and the entire composite is then placed between heated platens which serves to press against the outer surfaces of sheets 11 and 10 and mold the sheets around the metallic elements that are accordingly bonded therebetween. The resinous adhesive 58 which was only partially cured initially is also heated at this time and flows around and under between the various elements thus serving to enhance the adhesive bond between the sheets 10 and 11.

In place of an uncured plastic sheet 11 for the top laminate, there may be substituted liquid, paste or powdered uncured resinous thermosetting (plastic) molding compositions, which are applied by spraying, brushing, spreading or packing, depending upon the physical condition of the composition. Thus, a thermosetting resin in uncured state is applied as a layer to the composite shown in the lower part of Figure 10, and then squeezed between heated plates for heat-hardening the resinous composition and bringing its finished hardened upper surface level with the tops of the circuit terminals 41, 36 and 47. The finished unit has the same physical form as shown in Figures 12 and 13, regardless of the initial form of plastic layer 11.

The finished composite illustrated in Figure 11 so made, after a light sanding presents as its upper surface a smooth sheet 11 of insulating, hardened plastic through which appear only the terminal areas 41, 36 and 47, the underlying metallic areas 25 and 27 and the anchor projections 65, 66, 67 and 68, all being embedded between the two sheets 10 and 11 and thoroughly bonded thereto and additionally held by the flow of cementing resin 58 which during the final hardening and pressure step intimately fills all voids between the two sheets 10 and 11 which might possibly remain due to lack of complete conformation of sheets 10 and 11 to the irregularities of the metal circuits between the sheets. The completed unit has a flat lower insulating surface of the sheet 10 and a flat upper insulating surface of the sheet 11, through which project only those portions 41, 36 and 47, to which it is desired to make connections as by soldering at 70. If the areas in which contacts are formed and the underlying plastic sheet 10 were not drilled or punched earlier (before the contacts were etched out), this may be done now so as to permit the insertion of circuit wires thereinto from the front or rear for attachment of circuits by rivets or grommets or by soldering.

Such holes are illustrated at 41C, 36C and 47C of Figure 13. Figure 13 illustrates how a complete circuit can be quickly assembled, once the circuit component is complete. The circuit elements, such as resistors, capacitors, thermionic tubes, impedances, etc. exemplified by unit 54 are equipped with bare leads 55 and 56 which are stiff enough to support the units and yet capable of being bent. The connector-support wires of the units are bent in jigs, and then assembled on the circuit component by introducing the wires through the holes in the terminals to which they are to be soldered. Thus, wires 55, 56 and 71 are introduced into holes 36C, 47C and 41C, respectively, and protrude through a little, and the units hang together thus. Then the entire assembly is dipped with plastic side 11 down onto a clean molten solder surface and immediately the solder runs into the holes by capillarity and bonds the metallic elements together. The unit is quickly withdrawn from the solder pot and the solder hardens, thus fastening wire 55 to terminal 36, wire 56 to terminal 47 and wire 71 to terminal 41. The solder does not bridge terminals, as the excess drips off and smooths down, due to surface tension of the solder while molten. Dozens, or even hundreds, of terminal connections can thus be soldered in one operation in a time no longer than it takes to pick up the assembled unit and make the dip onto the molten solder surface. At the same time, it is worth remembering that any unit can be unsoldered individually and removed for repairs or replacement.

If it is desired to expose the circuit areas 25 and 27 or any other portions of the circuit, it is only necessary initially to outline such areas in stop-off paint or lacquer prior to the first etching operation, and such areas will thus remain at maximum thickness of the metal and be exposed in the final unit.

As many apparently widely different embodiments of this invention may be made without departing from the spirit and scope thereof, it is to be understood that I do not limit myself to the specific embodiments herein.

What I claim is:

1. The process of making circuit components wherein the circuit elements are contained between laminae of hardened plastic except for exposed terminals, circuit elements, etc. protruding through at least one of said laminations which comprises attaching a sheet of conductive metal to a first sheet of hardenable plastic insulation, applying a protective coating to a first series of areas of said metal which are ultimately to be exposed and while the metal is still bonded to the plastic etching away a part of the thickness of the unprotected metal, then applying additional protective coating to a second series of areas of the metal sheet of thus reduced thickness, said second series of areas being joined to at least some of the first series of areas to form circuit lines, etching away the exposed remainder of the metal sheet, removing the protective coating from said areas, forming and bonding to the first sheet of hardenable plastic, a layer of hardenable plastic so as to cover said metal in the second series of areas.

2. The process of claim 1 further characterized in that said layer is a second sheet of hardenable plastic with apertures therethrough coinciding with the first series of areas and is applied so as to allow the metal of said first series of areas to project through said apertures.

3. The process of claim 2 further characterized in that said sheets of hardenable plastic are bonded under heat and pressure.

4. The process of claim 2 further characterized in that the sheet of metal is attached to the first sheet of hardenable plastic by means of a heat curable resin adhesive and the sheets of metal resin are adhesively bonded by partially but not fully curing said resin and when the second sheet of hardenable resin is applied the composite is heated under pressure for finally hardening the sheets and resin adhesive.

5. The process of claim 1 further characterized in that apertures are provided through at least some of said first series of areas and the plastic sheet underlying same.

6. The process of making circuit components which are embedded in insulating material except where exposed for connections at selected areas which comprises adhering a sheet of conductive metal to a base sheet of insulating material to form a composite, applying to said selected areas of the metallic surface a stop-off material capable of protecting the metal from the eroding effect of etching, etching the exposed portion of said metal until it is eroded part way through the thickness of the metal, then halting the etching and applying additional stop-off material to additional areas of said metal sheet where the thickness of the sheet is reduced by etching, some of said additional areas being in the form of lines forming circuits joined to at least some of the selected areas so as to form the circuits of the component being formed and others of said additional areas forming tab projections from the selected areas and from said lines, etching away the remainder of the exposed metal, removing the stop-off material and forming on said composite a sheet of hardenable plastic to cover the entire area initially covered by said metal except for said selected areas and hardening and bonding said sheets under pressure, said selected areas being approximately level with the sheet of plastic and exposed therethrough.

7. A circut component comprising a pair of superimposed hardened plastic sheets of insulating material bonded together to form a composite sheet, the contacting faces of said sheet forming a meeting plane, thin conductive metal in the form of elongated areas forming circuits, some of said areas being terminated at thickened ends projecting through one of the plastic sheets to provide exposed connection points, said thickened ends having edges of outwardly concave shape and having a top edge of datum dimension and a bottom edge of relatively greater extension, said circuit areas of metal being sealed between said sheets at said meeting plane and said thickened ends being sealed to the adjacent portions of the sheet through which they project.

8. The circuit component of claim 7 further characterized in that certain of said areas of metal forming circuits have breaks therein and resistance material is formed across said breaks and the whole is sealed between said plastic sheets.

9. The circuit component of claim 7 further characterized in that along the margins of said circuit forming areas of metal and along the margins of said thickened ends of said metal and approximately in said meeting plane there are integral extending metallic projections forming anchors.

References Cited in the file of this patent

UNITED STATES PATENTS

| Number | Name | Date |
| --- | --- | --- |
| 1,257,394 | Reynolds | Feb. 26, 1918 |
| 1,283,563 | Roberts | Nov. 5, 1918 |
| 1,718,993 | Wermine | July 2, 1929 |
| 1,794,831 | Caruso | Mar. 3, 1931 |
| 1,804,024 | Nicolas et al. | May 5, 1931 |
| 2,244,009 | Hiensch | June 3, 1941 |
| 2,288,735 | O'Connell | July 7, 1942 |
| 2,441,960 | Eisler | May 25, 1948 |
| 2,443,119 | Rubin | June 8, 1948 |
| 2,447,541 | Sabee | Aug. 24, 1948 |
| 2,474,988 | Sargrove | July 5, 1949 |

FOREIGN PATENTS

| Number | Country | Date |
| --- | --- | --- |
| 602,492 | Great Britain | May 27, 1948 |

OTHER REFERENCES

New Advances in Printed Circuits, U. S. Dept. of Commerce, National Bureau of Standards Misc. Pub. 192, issued November 22, 1948.